United States Patent [19]

Colby et al.

[11] Patent Number: 4,967,211

[45] Date of Patent: Oct. 30, 1990

[54] PRINTING MACHINE WITH TONER DENSITY BALANCE IN SOLID AREAS AND LINE STROKES

[75] Inventors: Ralph S. Colby, Tucson, Ariz.; William M. Doumas, Boulder, Colo.; Jean-Claude Fouere, Tucson, Ariz.; Robert M. Rectenwald, Carmichael, Calif.

[73] Assignee: International Business Machines Corporation, Armonk, N.Y.

[21] Appl. No.: 206,402

[22] Filed: Jun. 14, 1988

[51] Int. Cl.$^5$ .................. G01D 15/14; H04N 1/23
[52] U.S. Cl. .................. 346/160; 355/214; 355/246; 358/300
[58] Field of Search .................. 355/214, 246; 346/153.1, 160; 358/300

[56] References Cited

U.S. PATENT DOCUMENTS

| | | | |
|---|---|---|---|
| 4,370,667 | 1/1983 | Ohara et al. | 346/108 |
| 4,403,257 | 9/1983 | Hsieh | 358/283 |
| 4,437,122 | 3/1984 | Walsh et al. | 358/166 |
| 4,460,909 | 7/1984 | Bassetti et al. | 346/160 |
| 4,463,364 | 7/1984 | Tamura | 340/160 |
| 4,482,243 | 11/1984 | Suzuki et al. | 355/246 |
| 4,491,875 | 1/1985 | Kawamura | 358/298 |
| 4,517,579 | 5/1985 | Kitamura | 346/160 |
| 4,544,264 | 10/1985 | Bassetti et al. | 346/160 |
| 4,595,956 | 6/1986 | Kawamura et al. | 358/283 |
| 4,625,222 | 11/1986 | Bassetti et al. | 346/160 |
| 4,734,734 | 3/1988 | Yano | 355/218 |
| 4,772,919 | 9/1988 | Yoshiyama et al. | 355/214 |

FOREIGN PATENT DOCUMENTS 0164222  12/1985  European Pat. Off. .
3630695   3/1987  Fed. Rep. of Germany .

Primary Examiner—Fred L. Braun
Attorney, Agent, or Firm—Charles E. Rohrer

[57] ABSTRACT

A printing machine with control device for identifying solid areas to be imaged. The printing machine is regulated on a picture element (pel) basis to produce pels representing the interior of solid areas with an intensity sufficient to create a relatively large development vector and to produce non-solid area pels, such as the edges of solid areas, text, and line pels with an intensity sufficient to create a smaller development vector. In that manner, toner deposit densities are balanced for solid interiors, the edges of solids, test, and lines. A control method is provided for establishing the desired line stroke width, toner density, and exposure level for an electrophotographic printer, and thereafter establishing the exposure level needed to balance toner density in the solid areas with the line toner density.

15 Claims, 3 Drawing Sheets

FIG. I.

PRINTING MACHINE WITH TONER DENSITY BALANCE IN SOLID AREAS AND LINE STROKES

This invention relates to electronic printing machines and more particularly to balancing the density of toner deposits placed on large solid areas with toner deposits placed on text or line drawings.

BACKGROUND OF THE INVENTION

In electrophotographic printers, a print is produced by creating an image of the print on a photoreceptive surface, developing the image and then fusing the image to print material. In machines which utilize plain bond paper or other ordinary image receiving material not specially coated, the electrophotographic process is of the transfer type where a photoreceptive material is placed around a rotating drum or arranged as a belt to be driven by a system of rollers. In the typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays which are modulated in accordance with the data to be printed. The light source may be a laser generator, an array of light-emitting diodes, etc., which direct light rays to the photoreceptor and cause it to bear a charge pattern which is a latent image of the information used to modulate the light rays. Modulation is usually derived from a character generator which is driven by image pattern data frequently produced by a computer and held in digitized form in memory.

The digitized image pattern data is organized with an addressability of a specific number of picture elements (pels) per inch and usually with each bit in memory representing a pel; for example, a common database addressability for use with printers is 240 pels per inch. For such a database, the light source is caused to image 240 dots, or pels, on each inch of the photoreceptor image area in both dimensions. Some of these pels represent dark areas, other pels represent background areas, and still other pels represent various intermediate shades. The photoreceptor will be discharged to different voltage levels by the light source to reflect the image pattern data in memory and establish the corresponding pel pattern of dark, background, and intermediate shades on the photoreceptor.

After producing an image on the photoreceptor, the next step in the electrophotographic process is to move the image to a developing station where developing material called toner is placed on the image. This material may be in the form of a colored powder which carries a charge and is electrostatically attracted to those areas which it is desired to develop. Thus, pels representing character printing should receive heavy toner deposits, white background areas should receive none, and gray or otherwise shaded halftone portions should receive intermediate amounts. To aid in attaining these results, a bias voltage is usually placed on the developer station to alter the magnitude of electrostatic fields in the development zone. Thus, the bias voltage is established at a level which provides a field development vector to move the charged toner particles away from the developing station toward the areas to be developed while simultaneously establishing an electrostatic field development vector to move the charged toner particles away from the background areas toward the developing station.

The photoreceptor, now with a developed image, is moved from the developer to a transfer station where a print receiving material, usually paper, is juxtaposed to the developed image. A charge is placed on the backside of the print paper so that when the paper is stripped from the photoreceptor, the toner material is held on the paper and removed from the photoreceptor. Toner remaining on the photoreceptor after transfer is called residual toner and is removed by a cleaning station before the photoreceptor can be reused.

The electrophotographic process is frequently used as a copy process as well as a printing process. In the copy process, a document to be copied is placed on a document glass and light is reflected from the original onto the photoconductor. Since white areas of the original document reflect large amounts of light, the photoreceptive material is discharged in white areas to relatively low levels while the dark areas continue to contain high voltage levels even after exposure. At the developing station, the toner material carries a charge opposite in polarity to the charge pattern on the photoreceptor. Because of the attraction of the oppositely charged toner, it adheres to the surface of the photoreceptor in large amounts on the undischarged areas representing the dark areas of the original document. This process is called a charged area development (CAD) process since heavy toner deposits are made on the heavily-charged areas of the photoconductor after exposure.

In electrophotographic printers, a CAD process can be used, but it has been found preferable to use a discharged area development (DAD) process, primarily because line and character printing results are improved. In the DAD process, the light-generating source, such as the laser or the array of light emitting diodes, etc., discharges the photoconductor in those areas which are desired to be developed; thus, the highly-charged areas of the photoconductor represent white background, whereas the discharged areas represent areas in which toner is to be deposited. In the DAD process, toner material carries a charge of the same polarity as the charge pattern on the photoreceptor. Because of the repulsion of the similarly charged toner, it does not adhere to the highly-charged background areas, but instead deposits in the more lowly charged discharged areas. The DAD process has been successfully used for many years in electrophotographic printers, such as the IBM 3800 printer.

The DAD process, while producing excellent character printing, has (like the CAD process) been characterized by difficulties in printing large solid areas in that a large solid area will frequently be printed with an undesirably dark boundary and an interior that is not dark enough. This represents an excessive deposit of toner on the boundaries of the solid area, and/or not enough toner deposit within the interior of the solid area. Attempts to correct this situation have produced good interior solid areas, but resulted in excessive toner deposition on characters and narrow lines as well as excessive toner deposition at the edges of the solid areas. When excessive toner is deposited on narrow lines, the lines broaden and adjacent lines may become indistinguishable.

While the background of the invention has been provided with reference to electrophotographic printers, the problems of toner balance are found in other non-impact electronic printing processes such as ion deposition and magnetic. The invention herein applies to these other processes as well.

It is an object of this invention to balance the toner deposits made on characters, narrow lines, and large solid areas so that excessive toner deposits do not occur on characters and line drawings, so that excessive toner deposits do not occur along the edges of solid areas and so that toner deposits in the interior of solid areas, are in balance with deposits on characters.

It is another object of this invention to establish control over toner deposition on a pel-by-pel basis. It is still another object to establish such control by differentially exposing each pel in accordance with image pattern data. Finally, it is an object of this invention to provide a procedure for determining the desired levels of differential control to be used in attaining the desired stroke width and toner density on line copy, and the balancing of toner density for solid areas.

The objects of the invention have not been met by the prior art. U.S. Pat. No. 4,517,579 relates to the problem of poorly-developed interiors for solid areas, and teaches a solution of entering white pels among the black ones to create additional fringe fields within the interior of the black area in order to attract more toner. This is obviously a different approach from that taken herein.

U.S. Pat. No. 4,460,909 relates to the smoothing of digitized diagonal lines by producing grey pels at the transition of black and white pels.

U.S. Pat. No. 4,544,264 relates to broadening fine lines, a problem encountered most frequently in CAD process machines.

U.S. Pat. No. 4,491,875 relates to an algorithm for gauging the blackness of a window of pels and then generating a pel pattern to reproduce it.

U.S. Pat. No. 4,595,956 provides an algorithm to recognize transitions from black-to-white and white-to-black.

U.S. Pat. No. 4,463,364 relates to the broadening of fine lines.

U.S. Pat. No. 4,403,257 relates to recognizing the difference between a halftone window and a text window through pattern recognition.

U.S. Pat. No. 4,370,667 relates to obtaining different exposure levels by frequency modulation of pulses provided to drive the light source.

U.S. Pat. No. 4,437,122 utilizes pattern recognition to determine the desirability of altering the pel pattern when converting from one addressability database to another.

RELATED PATENT APPLICATION

U.S. patent application Ser. No. 183,216, filed Apr. 19, 1988, now U.S. Pat. No. 4,879,577, relates to method and apparatus for controlling the electrostatic parameters of a discharged area development (DAD) machine. Such machines can profit from the use of both that invention and the invention described herein.

SUMMARY OF THE INVENTION

This invention involves control of the magnitude of the development vector in accordance with the type of data to be printed. In order that control can be obtained on a pel-by-pel basis, the invention provides a system of differential control for each pel in accordance with the data. In that manner, pels which are at the edges of solid areas are developed with a smaller magnitude vector than pels in the interior of solid areas. Similarly, and of particular value in the DAD process, pels for stroke data, such as text or lines, are developed with a different vector than are the pels in the interior of a solid area.

The invention contemplates the recognition of solid area data by viewing all data bits (where each bit represents a pel) in a convenient size matrix; for example, a 5×5 bit matrix. That data is compared to sample patterns, and if a solid area pattern is recognized, the center bit of the matrix is printed at a suitable exposure level Each bit to be imaged is examined as the center bit of the matrix. Bits identified as representing non-solid area pels are imaged at a different exposure level from bits representing solid area pels.

To practice the invention, means are provided for identifying the type of image pattern data being sent to the image generator. If the image pattern data is comprised of stroke data, such as text or line graphic information, then this invention adjusts the development vector to a level which prevents excessive toner deposition. Should the image pattern data be recognized as solid area data, the development vector is again adjusted so that the interior of the solid area receives adequate toner deposition. Additionally, the development vector for the edges of solid area information can be adjusted to prevent excessive toner deposition at the boundary. The preferred technique for adjusting the development vector in an electrophotographic printer is to control the illumination intensity produced by the light generating source For example, in the DAD process, if text data is to be printed, the illumination intensity is reduced to a value less than that intensity used for the printing of solid area data. In that manner, the development vector is adjusted on a pel-by-pel basis in accordance with data type resulting in a balancing of toner density across the entirety of the image patterns regardless of whether it is text data or solid area data and regardless of how these data are intermixed on a page.

This invention also contemplates a procedure for determining the amount of differential exposure required for a particular machine, or family of machines, to attain balance in toner deposition. The procedure involves determining the photoconductor response to exposure over a range of exposures and the toner deposit densities which result from these exposures for: (1) line copy and (2) for solid areas. A determination is also made of the particular stroke width which corresponds to particular line copy deposit densities. With this information, the correct exposure intensity can be established for a desired stroke width and toner density The exposure intensity for solid areas can then be set to provide a corresponding toner density in the interior thereof.

BRIEF DESCRIPTION OF THE DRAWING

The above-mentioned objects and other features and objects of this invention, and the manner of attaining them will become more apparent and the invention itself will best be understood by reference to the following description of embodiments of the invention taken in conjunction with the accompanying drawing the description of which follows.

DESCRIPTION OF THE PREFERRED EMBODIMENTS

Figure 1:
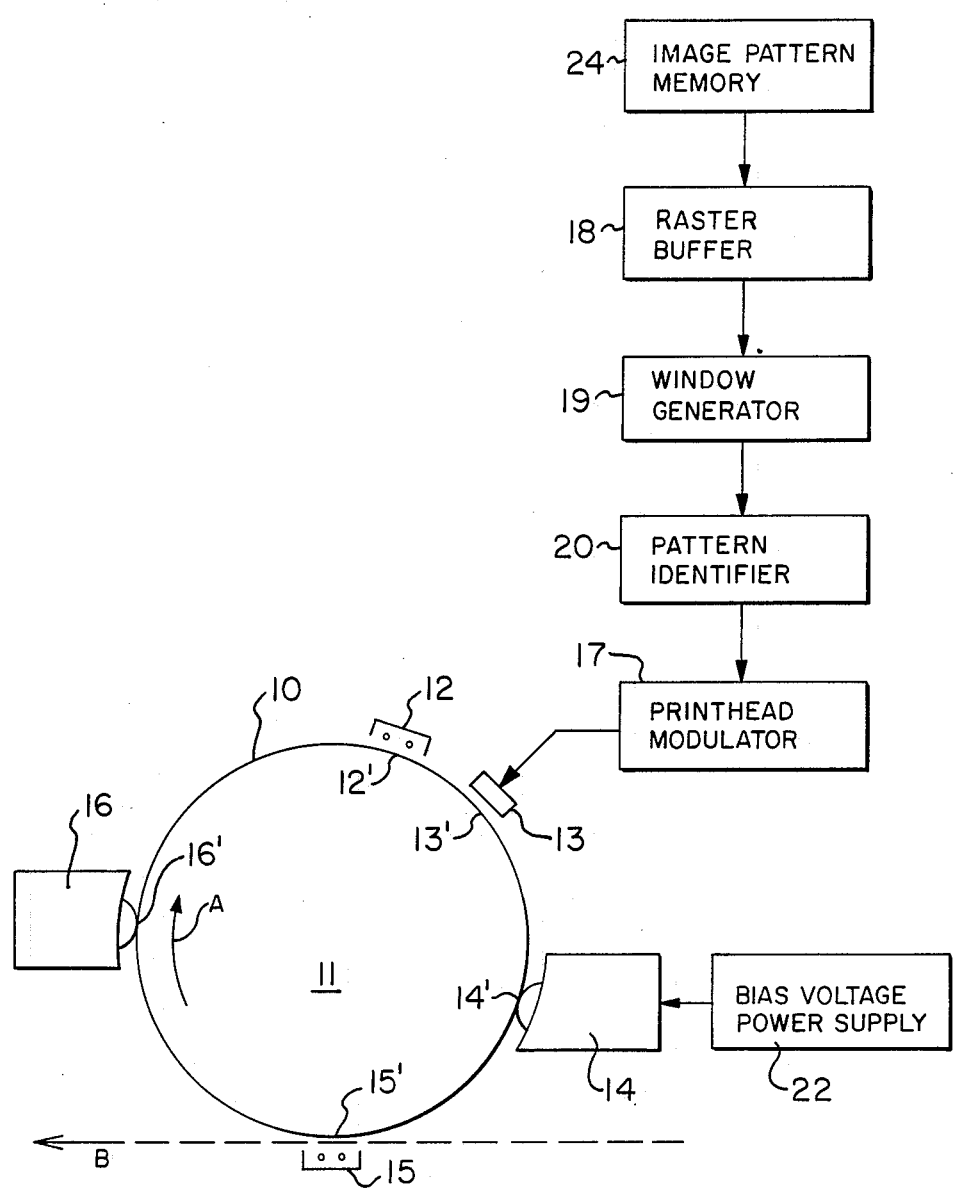
FIG. 1 is a diagrammatic view of a typical electrophotographic printer of either the CAD or DAD type.

FIG. 1 shows a typical electrophotographic machine such as would be used to implement this invention. Photoreceptive material 10 is placed on the surface of a drum 11 which is driven by motive means, not shown, to rotate in the direction A. A charge generator 12 places a uniform charge of several hundred volts across the surface of the photoreceptor at charging station 12'. The charged photoreceptor is mounted in a dark enclosure, not shown, and rotates to a printhead 13 which can be comprised of a suitable light generating source, such as a laser generator, an array of light emitting diodes, etc. The light source selectively exposes the charged photoreceptor at imaging station 13' to discharge it in areas which are desired to be developed (DAD process.)

The discharged areas of the photoreceptor are developed at developing station 14' by developer apparatus 14 which applies toner so that the photoreceptor carries a visually perceptible image of the data. The developed image rotates to transfer station 15' where print paper, moving in the direction B, is juxtaposed with the surface of the photoreceptor. A charge opposite in polarity to the charge on the toner is placed on the backside of the print paper by transfer charge generator 15 such that when the paper is stripped from the surface of the photoreceptor, toner will be attracted to the paper and leave the surface of photoreceptor 10. Any remaining residual toner is cleaned from the photoreceptor at cleaning station 16' by cleaning apparatus 16.

The selective application of light rays to the photoreceptor 10, at imaging station 13', is accomplished through printhead modulator means 17. For a solid state laser, or for a light emitting diode array, the printhead modulator is comprised of a power supply, which will either turn the light source on for longer or shorter periods of time to accomplish varying degrees of photoreceptor discharge in accordance with the pattern data, or it will turn the light-generating source on to a greater or lesser illumination intensity in accordance with that data In any event, modulation will occur in accordance with that data contained in memory 24. That data is sent to a raster buffer 18 and on to a window generator means 19 where each bit to be printed will be viewed at the center of a matrix, for example, a 5×5 bit window, in order that data patterns may be identified by pattern identifier means 20. Should, for example, a solid area pattern be identified, the printhead modulator will act to cause the printhead to generate light rays at a higher intensity level or for a longer exposure time than it would if text patterns are identified. The raster buffer, window generator, and various algorithms to identify patterns are well known to the art and do not comprise the substance of the instant invention. However, it is contemplated that each bit of the data stream to be imaged will be examined at the center of a matrix window of 5×5 bits, 7×7 bits, or some other convenient window size. In the case of a 5×5 bit window, if the window contains bits representing all dark pels, a preferred algorithm provides, as a result, the determination of a solid area, and the bit at the center of the matrix will be exposed at a level appropriate for solid area development. With such an algorithm, the two bits representing the two edge pels of a solid area will be determined as non-solid area pels and will receive exposure appropriate for character or line development, thus avoiding excessive toner deposition at the edges of solid areas.

Figure 2:
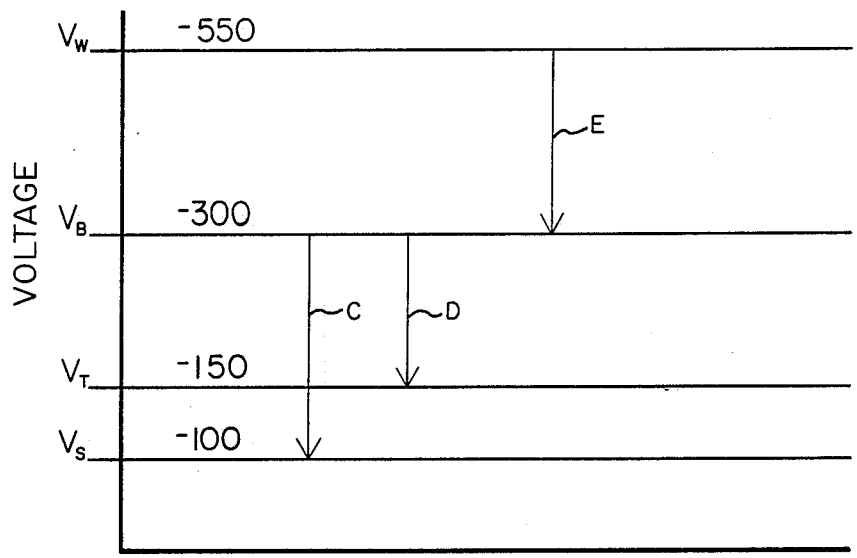
FIG. 2 is a graphical representation of voltage levels present in a typical DAD process machine such as shown in FIG. 1.

FIG. 2 illustrates the principles of discharged area development. In the machine shown in FIG. 1, charge generator 12 deposits a charge of −550 volts, $V_w$, on the photoreceptor. In accordance with the principles of this invention, printhead 13 discharges the photoreceptor to a level of −100 volts, $V_s$, for all data representing solid areas to be developed. Printhead 13 discharges photoreceptor 10 to −150 volts, $V_t$, for areas to be developed as text or line graphic data. The bias voltage power supply 22 (FIG. 1) places a development bias voltage, $V_b$, of −300 volts on the developer 14.

The result of these voltage levels is to produce an electrostatic field development vector C of 200 volts which will move negatively charged toner from the developer to the solid areas to be developed. Similarly, development vector D, 150 volts, will act to move negatively charged toner from the developer to the photoreceptor for those areas on the photoreceptor that are to be developed as text. Finally, the development vector E, 250 volts, acts to prevent the movement of negatively charged toner from the developer to the background areas of the photoreceptor which remain at a highly-charged level of approximately −550 volts after exposure Thus, in accordance with the practice of this invention, the development vector for solid areas is shown to be of a different and substantially greater value than the development vector for text or line graphics By providing a variation in development vectors, the problem of excessive toner deposit on textual material can be dealt with, together with the problem of a lack of toner deposit on the interior of solid areas.

The problem of unbalanced toner deposits in the prior art arose because the electrostatic fields, which control the amount of toner deposited, are larger for text or graphics than for solid areas because the fields depend on the gradients of voltage patterns created by the image. For small patterns, points, narrow lines, etc., voltage gradients from pel-to-pel are high, while in the interior of large solid areas voltage gradients are small. To deal with the problem of variations in gradients, this invention alters the development vectors so that toner deposits are balanced despite the unbalance in voltage gradients.

Figure 3:
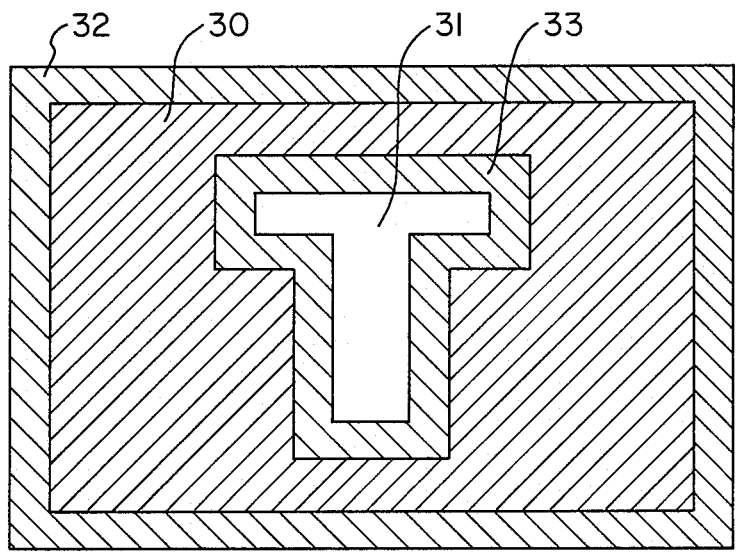
FIG. 3 is an illustration of solid area printing for use in the explanation of this invention.

FIG. 3 illustrates the gradient problem relating to the edges of the solid areas. In FIG. 3, a large solid area 30 is to be developed with toner of a specific color, for example, black. In the center of the large developed area, a white letter "T" 31 appears as it might in the middle of a logo. If this invention were not practiced, it is quite likely that the logo shown in FIG. 3 would be reproduced with a dark border 32 on the exterior edge of the logo, and a dark border 33 on the interior edge of the logo, with an insufficiently developed solid area 30. This, again, is because large voltage gradients appear at the boundaries 32 and 33 of the solid area while the interior of the solid area 30 has smaller voltage gradients.

These gradients are the result of discharging the exposed areas to a level of −100 volts whereas the unexposed areas remain at −550 volts. Consequently, where the solid area is adjacent to the undischarged area, a very significant voltage gradient results. The inventors recognized that the difference in voltage gradient can be counteracted by changing the magnitude of the development vector. Thus, in the edge areas 32 and 33, which are usually 16 mils width or less, it is desirable to reduce the development vector to a level such as used for text, development vector D in FIG. 2, while retaining a high development vector equal to development vector C for the solid areas 30. In that manner, toner density balancing can be achieved on the edges of solid areas as well as in the interior of solid areas.

Figure 4:
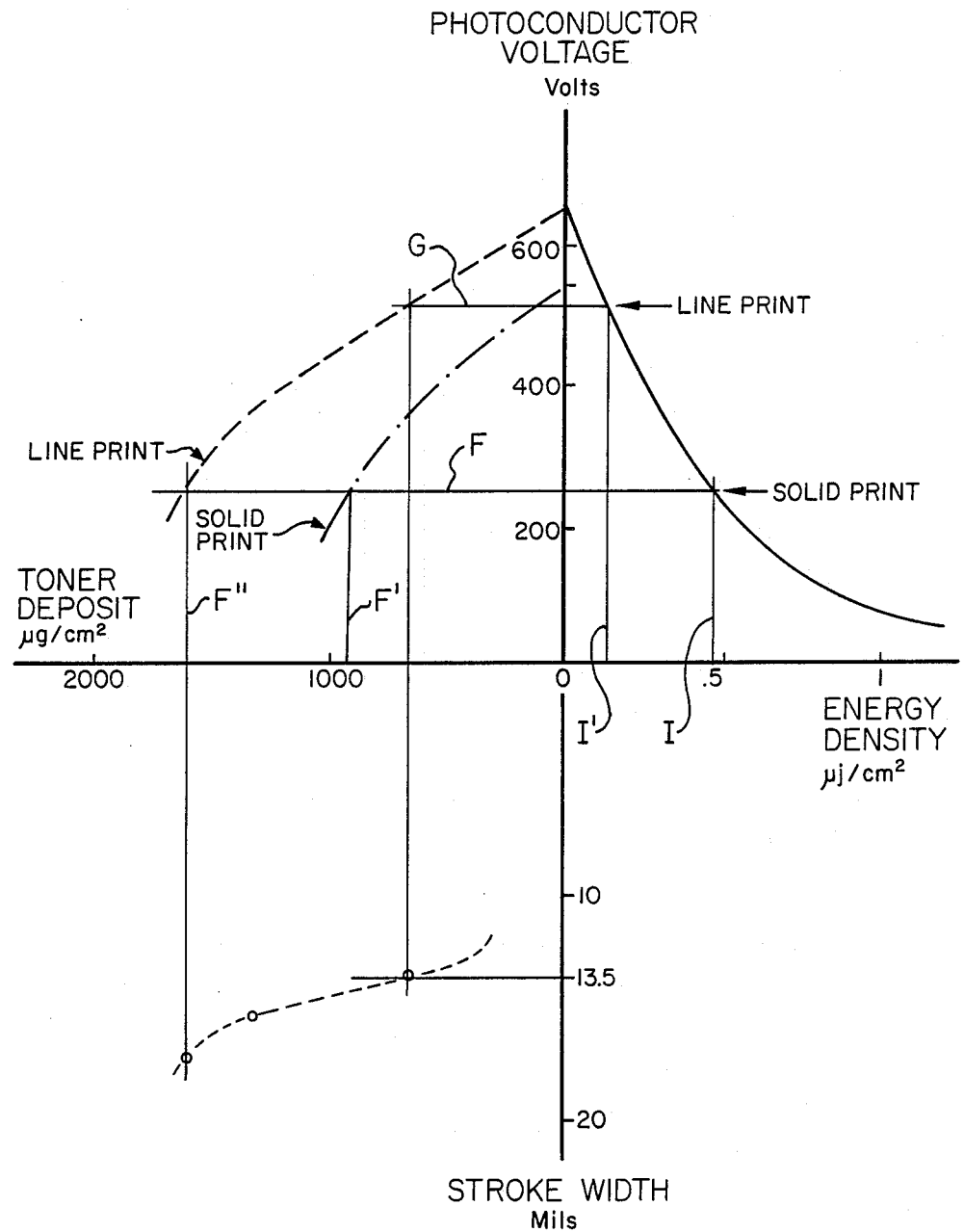
FIG. 4 is an illustration of the relationship of exposure intensity, toner density, and stroke width for line print as well as exposure intensity and toner density for solid areas for the machine of FIG. 1.

FIG. 4 shows the method for establishing the manner in which a multiple exposure intensity system should be operated to accomplish toner deposit balancing. The method requires experimental measurement of certain characteristics of each printer or printer family of machines to which it is applied. That is necessary because the extent of interaction between charged photoconductor materials and charged toner materials varies with the chemical makeup of those components as well as with the mechanical and electrical hardware of the printer. The required results of the measurements that must be made for a particular printer, or printer family, are illustrated in FIG. 4. In this example, the upper right quadrant of the chart represents photoconductor response to exposure expressed in volts at the photoconductor surface. The upper left quadrant shows the toner deposit densities for line printing (text or graphics), and toner deposit densities for solid area printing that result from photoconductor voltages in combination with the characteristics of the developer and toner for the particular printer. Finally, the lower left quadrant shows the printed stroke width (for 3 pel wide strokes at 240 pels per inch) that correspond to the line print deposit densities.

To illustrate with an example, FIG. 4 shows the characteristic curves experimentally obtained for a particular printer. Assume that the exposure energy density is chosen to result in a photoconductor voltage of 250 volts as shown at line F. As a result, solid area print would receive about 900 micrograms of toner per square centimeter as shown at line F' while a line print would receive about 1,700 as shown at line F". Obviously, this is a serious imbalance producing much darker line print than solid area print Further, the corresponding line width for three pel strokes would be about 17 mils or in excess of the desired value of about 13.5 mils. Since this invention now permits exposure for solid area print and for line print to be set independently, the photoconductor exposure for line print is set at or near 500 volts as shown at line G. This results in a line print deposit density of about 700 micrograms per square centimeter and a three pel stroke width of 13.5 mils with an exposure intensity of I'. The solid area toner density can now be changed to balance the line density of 700, but in this example is left at 900 since that is not a serious imbalance for this particular machine. The particular illumination intensity levels to obtain the desired photoconductor exposures are established through lines I and I' and the printer is operated accordingly. As is apparent, other deposit density and stroke width relationships can be obtained if desired.

While the invention has been particularly shown and described with reference to the DAD process, the invention is also applicable to the CAD process. For example, when solid area data is recognized, the exposure of the pels which produce the edges of solid areas may be exposed at a level that balances toner deposits with the less exposed interior of solid areas. Such a differential exposure is well within the skill of the art of those artisans familiar with the teachings presented here. However, in a CAD process machine, due to the difficulty in preventing narrow lines from being obliterated, it probably would not be desirable to have a development vector that is different for the interior of solid areas from that used for text and narrow lines.

The invention is also applicable to non-impact printing processes other than electrophotographic. For example, in ion deposition printing, solid area pels may be printed at higher charge levels than non-solid area pels in order to achieve different development vectors and achieve balance in toner deposition. It will be understood that the foregoing and other changes in the form and details of the invention may be made therein without departing from the spirit and scope of the invention.

What is claimed is:

1. A printing machine including image receiving material, imaging means, and a developer means containing toner material, said imaging means operated to produce a latent image on said image receiving material in accordance with image pattern data, said machine comprising:

said image receiving material mounted for movement, imaging means for producing a charge pattern on the surface of said image receiving material in accordance with image pattern data, developer means located adjacent said image receiving material for depositing said toner on said material to produce a visually perceptible image, means for identifying image pattern data representing picture elements (pels) for the interior of solid areas, and control means for regulating said imaging means to establish the magnitude of development vectors when developing solid area pels at a level different from the magnitude used for developing non-solid area pels.

2. The machine of claim 1 wherein said non-solid area pels include the edge pels of solid areas.

3. The machine of claim 2 wherein said edge pels of solid areas are defined as those pels making up an area equal to or less than 16 mils width at the boundary of solid areas.

4. The machine of claim 1 wherein said non-solid area pels include stroke area pels producing areas to be developed of 16 mils width or less.

5. The machine of claim 1 wherein said control means regulates the power supplied to said imaging means to a first level appropriate for establishing the magnitude of said vector when developing non-solid area pels, and regulates said power to a second level appropriate for establishing the magnitude of said vector when developing solid area pels.

6. The machine of claim 5 wherein said non-solid area pels include those stroke area pels which produce areas to be developed of 16 mils width or less.

7. The machine of claim 5 wherein said control means regulates said power to a level appropriate for establishing the magnitude of said vector when developing the edge pels of solid areas to a level different from the magnitude used for developing solid area pels.

8. The machine of claim 7 wherein said edge pels of solid areas are defined as those pels making up an area equal to or less than 16 mils width at the boundary of solid areas.

9. The machine of claim 7 further including charging means located adjacent said image receiving material for placing a relatively uniform charge on the surface of said image receiving material as it moves therepast, and wherein:
said image receiving material is comprised of a photoconductor, and
said imaging means includes a light source for directing light rays to the surface of said photoconductor to discharge said photoconductor in selected areas in accordance with image pattern data.

10. The machine of claim 9 further including developer bias means for placing a bias voltage on said developer means for altering the magnitude of said development vectors in a manner to improve the maintenance of toner free background while continuing the differentials in magnitude between solid area pels and non-solid area pels.

11. Apparatus for differentially exposing photoreceptive material on a pel-by-pel basis comprising:
photoreceptive material mounted for movement,
a charger located adjacent said photoreceptive material for placing an electrical charge on said material,
a printhead capable of producing light rays and directing said light rays to said photoreceptive material to selectively discharge said material in accordance with image pattern data in order to produce a latent image of said pattern data on said material,
a developer located adjacent said photoreceptive material for depositing toner on said latent image to produce a visually perceptible image,
image pattern memory for holding said image pattern data,
printhead control means connected to said image pattern memory and said printhead to identify solid area data in the image pattern and control said printhead to increase the exposure intensity when solid area pels are to be produced.

12. The machine of claim 11 wherein said control means increases the power level to said printhead when solid area pels are to be produced.

13. The machine of claim 12 further including developer bias means connected to said developer to place a bias voltage on said developer in order to establish a first development vector tending to prevent deposit of said toner on the undischarged pels of said photoreceptive material; to establish a second development vector tending to cause deposit of said toner on non-solid area pels to produce a desired toner density on said photoreceptive material; and to establish a third development vector of greater magnitude than said second development vector, said third vector tending to cause deposit of said toner on solid area pels in balance with said desired toner density.

14. A method of establishing differential exposure levels of a pel-by-pel basis for the operation of an electrophotographic printer, comprising the steps of:
operating said printer at various exposure intensity levels in order to establish the relationship between said exposure intensity levels and corresponding line toner deposit densities,
establishing the relationship between said line toner deposit densities and stroke widths resulting from said line toner deposit densities,
selecting the line toner deposit density and corresponding exposure intensity level which provides a line stroke width of the desired size,
operating said printer at various exposure intensity levels for establishing the relationship between said exposure intensity levels and toner deposit densities for solid area pel development,
selecting the exposure intensity level which produces a solid area toner density in balance with said selected line toner density,
whereby said printer can be operated with a different exposure intensity level for solid area pels than that level used for non-solid area pels in order to maintain balanced toner deposit densities on solid area and non-solid area pels.

15. The method of claim 14 wherein said various exposure intensity levels are obtained by operating the printhead at various power input levels.

* * * * *